US007773091B2

(12) United States Patent
Giron et al.

(10) Patent No.: US 7,773,091 B2
(45) Date of Patent: Aug. 10, 2010

(54) METHOD AND DEVICE FOR GENERATING A SYNTHESIZED IMAGE OF AT LEAST ONE FRINGE OF LASHES

(75) Inventors: Franck Giron, Ferrieres-en-Brie (FR); Eric Doublet, Vigneux sur Seine (FR)

(73) Assignee: L'Oreal, Paris (FR)

( * ) Notice: Subject to any disclaimer, the term of this patent is extended or adjusted under 35 U.S.C. 154(b) by 748 days.

(21) Appl. No.: 11/219,709

(22) Filed: Sep. 7, 2005

(65) Prior Publication Data
US 2006/0055705 A1 Mar. 16, 2006

Related U.S. Application Data

(60) Provisional application No. 60/675,453, filed on Apr. 28, 2005.

(30) Foreign Application Priority Data

Sep. 7, 2004 (FR) .................................. 04 09532

(51) Int. Cl.
*G09G 5/00* (2006.01)
(52) U.S. Cl. ..................... 345/582; 345/619; 345/632
(58) Field of Classification Search ..................... None
See application file for complete search history.

(56) References Cited

U.S. PATENT DOCUMENTS

| 6,091,836 | A * | 7/2000 | Takano et al. | 382/118 |
| 6,293,284 | B1 * | 9/2001 | Rigg | 132/200 |
| 6,937,755 | B2 * | 8/2005 | Orpaz et al. | 382/162 |
| 7,079,158 | B2 * | 7/2006 | Lambertsen | 345/630 |
| 7,123,753 | B2 * | 10/2006 | Takahashi et al. | 382/117 |
| 7,436,987 | B2 * | 10/2008 | Takano et al. | 382/117 |
| 2003/0063794 | A1 * | 4/2003 | Rubinstenn et al. | 382/154 |
| 2005/0165706 | A1 * | 7/2005 | Giacchetti | 706/20 |
| 2005/0203724 | A1 * | 9/2005 | Orpaz et al. | 703/6 |

FOREIGN PATENT DOCUMENTS

| EP | 1 134 701 A2 | 9/2001 |
| EP | 1 298 597 A2 | 4/2003 |
| JP | A-11-025253 | 1/1999 |

(Continued)

OTHER PUBLICATIONS

Watanabe et al., "A Trigonal Prism-Based Method for Hair Image Generation," Jan. 1992, pp. 47-53, IEEE Computer Graphics and Applications, vol. 12, No. 1.

(Continued)

*Primary Examiner*—M Good Johnson
(74) *Attorney, Agent, or Firm*—Oliff & Berridge, PLC

(57) ABSTRACT

A method for simulating the appearance of at least one fringe of lashes may include generating, based on at least one value of at least one simulation parameter that is modifiable by a user, at least one 3D image of the at least one fringe of lashes. The at least one 3D image may be generated from a multizone simulation of the fringe. The multizone simulation may allow the user to define values of simulation parameters specific to at least two different zones of the at least one fringe of lashes.

23 Claims, 5 Drawing Sheets

FOREIGN PATENT DOCUMENTS

| | | |
|---|---|---|
| JP | A-2000-011144 | 1/2000 |
| JP | A-2003-044837 | 2/2003 |
| JP | A-2004-038918 | 2/2004 |

OTHER PUBLICATIONS

Harvey, "Maya Tutorials. Tutorial 7: Making Eyelashes," 'Online!, Sep. 2003, pp. 1-11, URL:http://members.iinet.net.au/{zapo/tutorials_for_DVA_site/tute_7_eyelashes/tute_7_eyelashes.htm.

Siquier, "Tutorials. Eyelashes" 'Online! Jun. 8, 2003, pp. 1-4, URL:http://www.juansiquier.com/tutoriales/eyelashes/eyelashes_eng.htm.

Swerin, "Tutorials. How to Patchmodel a Head in Maya—Create an Eyelash" 'Online!, Aug. 22, 2000, pp. 1-6, URL:http;://www.highend3d.com/maya/tutorials/patch/eyelash.3d.

Poser 4, Japanese edition 3D figure animation software enabling a variety of expression.

Poser 4, Japanese edition, leave it to Poser 4, more various rendering is possible.

Poser Figure Studio, first edition.

Poser 4, Japanese edition 3D figure animation software enabling a variety of expression, Yasuyuki Shimizu, Graphics World, Japan, IDG Comm. Co., Ltd. vol. 2, No. 11, Nov. 1, 1999, pp. 96-97.

Poser 4, Japanese edition, leave it to Poser 4, more various rendering is possible, Kazuyuki Kitaura, Mac People, Japan, Ascii Co., Ltd., vol. 5, No. 23, Dec. 1, 1999, p. 99.

Poser Figure Studio, first edition, Schinichi Tasaki, Ohmsha Co., Ltd., Dec. 5, 2004, 1st edition, pp. 49-80 and pp. 118-121.

* cited by examiner

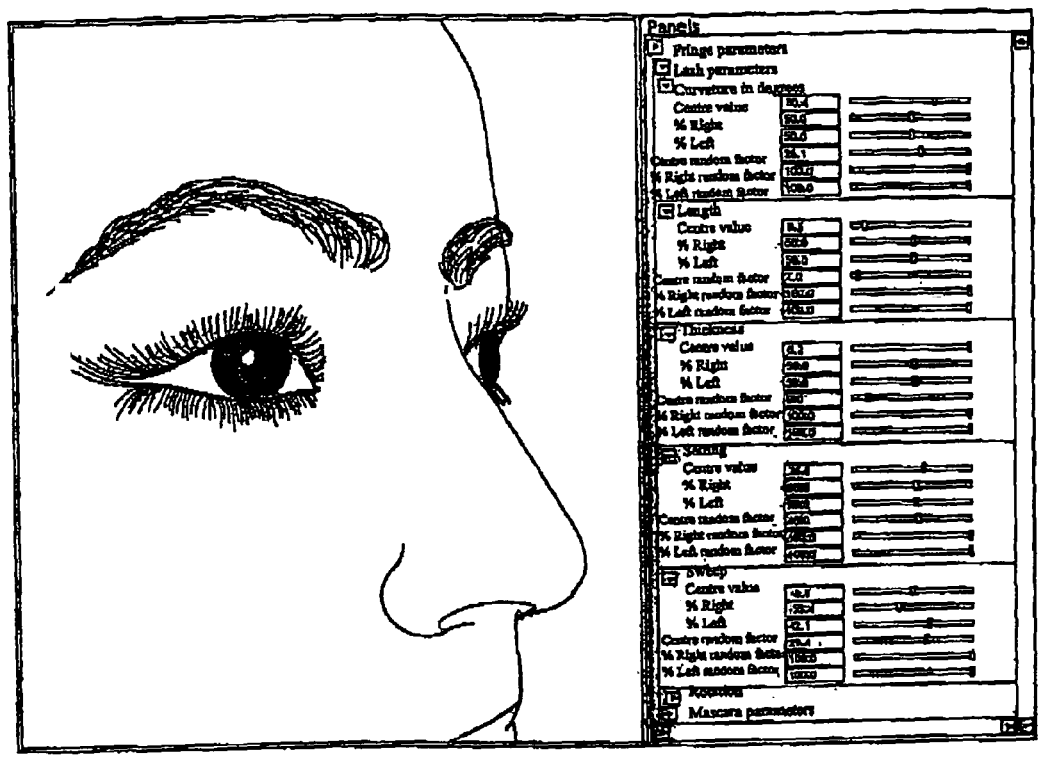
FIG.5
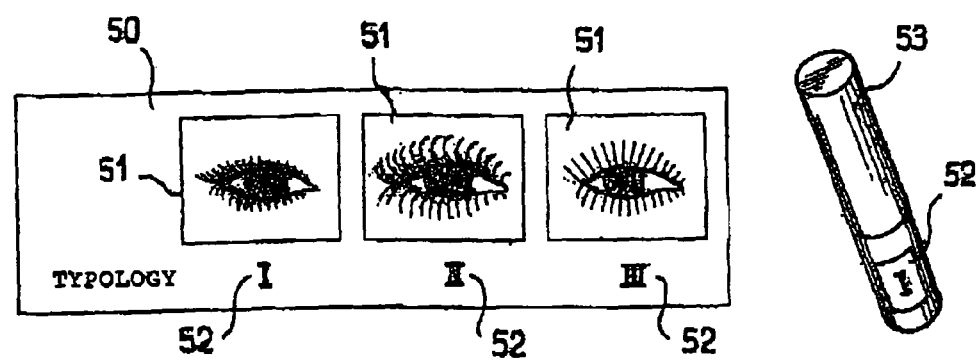
FIG.6
FIG.7

METHOD AND DEVICE FOR GENERATING A SYNTHESIZED IMAGE OF AT LEAST ONE FRINGE OF LASHES

This non-provisional application claims the benefit of French Application No. 04 09532 filed on Sep. 7, 2004, and U.S. Provisional Application No. 60/675,453 filed on Apr. 28, 2005, the entire disclosures of which are incorporated herein by reference.

BACKGROUND

The present invention relates to a method and to a device for simulating at least the appearance of at least one fringe of lashes.

SUMMARY

The expression "fringe of lashes" includes, as used in the description and the claims, both the lashes of the lower and upper eyelids and those of the superciliary arches.

There is a need to make it easier to develop new products or treatments for lashes, and to benefit from tools that facilitate evaluation of lashes and allow advice, for example, regarding make-up, to be given.

According to exemplary embodiments of the invention, a method and/or a device for simulating the appearance of at least one fringe of lashes may include generating, based on at least one simulation parameter that is modifiable by a user, at least one 3D image of the at least one fringe of lashes.

In exemplary embodiments, the 3D image may, for example, be generated so as to correspond to a given viewing direction, which may be selected by the user as desired or required.

Exemplary embodiments of the invention may, for example, make it possible to propose a treatment and/or a product that meets expectations of an individual after having simulated an effect of such a product and/or treatment on the individual's lashes. In exemplary embodiments, the method may especially allow the individual to visualize various make-up results and/or treatments, for example, make-up extremes, before making a choice.

In exemplary embodiments, the treatment may comprise heat curling of the eyelashes.

Exemplary embodiments of the invention may, for example, allow an evaluation atlas to be compiled, by producing several virtual images of lashes. Such virtual images may correspond, for example, to various values of a given parameter.

Exemplary embodiments of the invention may also contribute to making Internet sites offering advice on beauty more attractive, especially by providing novel options for interactive virtual eye make-up and/or cosmetic treatment.

In an exemplary embodiment of how the invention may be implemented, the simulation is performed so as to take into account whether or not a product has been applied to the lashes and/or a treatment has been carried out. This may allow a viewer to visualize the impact on the appearance of the eyes, for example, by a mascara or the impact of a treatment apparatus, such as a heat curler.

The term "3D image" as used herein is understood to mean an image generated from the coordinates in space of at least part of the fringe of lashes. In exemplary embodiments, a 3D image may make it possible, when desired or required, if the display software so allows, for the viewer to vary the orientation of the image relative to the viewing direction. The 3D image may be displayed on a conventional, cathode-ray, liquid-crystal or plasma screen, with or without stereographic vision. Stereographic vision may be obtained, if desired or required, by using suitable spectacles, for example, with red and green lenses, or using liquid-crystal shutters synchronized with the display. The 3D image may be printed or transmitted to a remote point, for example, in the form of a file. The 3D image may also be recorded on any suitable medium, for example, an optical or electronic medium. The 3D image may include topographical information and/or textural information.

In exemplary embodiments, the synthesized (generated) image of the fringe of lashes may be incorporated into the image of a face, which may advantageously be a 3D image. The image of the face may especially be at least partly a real image, for example, of an individual to whom beauty advice is being offered. "Real image" as used herein means that the image is intended to reproduce at least one of relief and texture of the real face. Such a real image may preferably reproduce both. The real image may enable the viewer to recognize the individual on whom the image is based. The expression "beauty advice" as used herein is understood to mean advice that may apply, for example, among other things, to a make-up look to be created or to a care product to be applied.

In exemplary embodiments, the beauty advice may comprise having the individual self evaluate at least one feature of his/her lashes by viewing at least one simulated fringe and modifying at least one simulation parameter to make the simulated fringe reflect a desired result.

In another exemplary embodiment of how the invention may be implemented, the synthesized image is generated lash by lash. The fringe of lashes may comprise, for example, between 10 and 300 lashes.

In exemplary embodiments, at least one random factor may be applied to at least one characteristic of at least one of the fringe, the lashes that make up the fringe, the product applied to the lashes and/or the treatment carried out, which may enhance the realism of the simulation.

In exemplary embodiments, such a random factor may, for example, be applied to at least one geometric characteristic of the lashes, which may especially be selected from one or more of curvature, length and thickness of the lashes, and/or angles that define an orientation in which the lashes extend from a surface of the skin.

In exemplary embodiments, alternatively or additionally, the random factor may be applied to at least one characteristic of the fringe of lashes, for example, a characteristic selected from a number of lashes, presence or absence of a make-up product on the lashes, and a thickness of the fringe.

In exemplary embodiments, the random factor may also be applied to a thickness of product deposited on the lashes.

In exemplary embodiments, the random factor may also be applied to at least one feature of a treatment apparatus, such as a heat curler.

In exemplary embodiments, the synthesized image may be generated from a multizone simulation of the fringe. The multizone simulation may allow the user to input values of simulation parameters specific to at least two different zones of the fringe. For example, at least one central zone and two zones, left and right, located respectively on either side of the central zone may be differently parameterized by the user. The multizone simulation may allow a user to simulate make-up not applied uniformly to the entire fringe of lashes or a treatment not carried out uniformly over the entire fringe of lashes. If desired or required, the simulation method and/or device may take into account a nature of an applicator and the make-up product applied to the lashes. The simulation method and/or device may also take into account at least one of a nature of the treatment apparatus, a manner in which the treatment is carried out, and at least one characteristic of the product used with the treatment apparatus.

In another exemplary embodiment of how the invention may be implemented, the user may modify at least one value of a simulation parameter relating to at least one fringe characteristic, which may, for example, be selected from a number of lashes, presence or absence of a make-up product on the lashes, presence or absence of a treatment on the lashes, and a thickness of the fringe.

In another exemplary embodiment of how the invention may be implemented, the user may modify at least one value of a simulation parameter relating to at least one lash characteristic, which may be selected, for example, from a curvature of the lashes, a length of the lashes, a thickness of the lashes, and angles that define an orientation in which the lashes extend from a surface of the skin.

In another exemplary embodiment of how the invention may be implemented, the user may modify at least one value of a simulation parameter relating to at least one characteristic of a product applied to the lashes, which may be selected, for example, from a thickness of deposited product applied and a distribution of the product over the fringe of lashes.

In exemplary embodiments, the user may modify at least one value of a simulation parameter relating to at least one characteristic of a treatment carried out on the lashes.

In another exemplary embodiment of how the invention may be implemented, at least one means of setting a value of at least one simulation parameter is displayed on a same screen as the synthesized image of the fringe of lashes and the appearance of the synthesized image is modified almost simultaneously in response to a change of the simulation parameter. The term "almost simultaneously" as used herein should be understood to mean that any new synthesized image is displayed after the time needed to compute its definition. The parameter setting means may comprise, for example, a cursor and/or a field for entering a value.

In exemplary embodiments, the value of the parameters that are displayed may be metric values. The length of the eyelashes may be given, for example, in cm or in.

In another exemplary embodiment of how the invention may be implemented, the user may be allowed to vary a viewing direction continuously or otherwise. A means of setting the viewing direction, for example, a cursor or arrows, may be displayed simultaneously with the synthesized image of the fringe of lashes.

In another exemplary embodiment of how the invention may be implemented, several images of the face of an individual from predefined viewing directions are acquired and the synthesized images of the lashes that correspond to these viewing directions are computed. A 3D image of the fringe of lashes corresponding to one viewing direction may be embedded in an image of the face acquired from a same direction.

In exemplary embodiments, only a portion of the face of the individual may be acquired and analyzed for generation of a 3D image.

For example, only about half a face of the individual may be acquired and analyzed. In such embodiments, the entire face may be reconstructed using a symmetry between the two half faces.

In exemplary embodiments, data concerning relief of the face may be obtained using at least one camera and any suitable lighting, for example, structured lighting.

In exemplary embodiments, data may be acquired over 180°, for example, substantially over 360°, to enable a display and/or simulation of other features of the individual than the lashes, for example, the hair.

In another exemplary embodiment of how the invention may be implemented, the user may be allowed to vary an illumination of the face that includes the 3D image of the fringe of lashes, especially brightness and/or a direction of incident light.

In exemplary embodiments, the illumination may be varied according to predetermined conditions such as, for example, midday light, evening light, and/or artificial light.

Exemplary embodiments of the invention may provide a device for simulating the appearance of at least one fringe of lashes, which comprises: a computing unit; and acquisition means, the computing unit being configured to generate, based on at least one value of at least one simulation parameter that is acquired by the acquisition means and that is modifiable by the user, at least one 3D image of the fringe of lashes.

In exemplary embodiments, the device may further include display means for displaying the at least one (synthesized) 3D image. However, especially in embodiments in which the result of the simulation is transmitted to a remote point in the form of a file or recorded on an optical or electronic medium, the display means need not form part of the device. The result of the simulation may be alternatively or additionally printed.

In exemplary embodiments, the acquisition means may comprise a 3D image acquisition system. The acquisition system may be useful, for example, to input relief of a face and/or texture of the face, especially the face the individual to whom the beauty advice will be given following the use of the device.

In exemplary embodiments, the 3D image acquisition system may comprise multiview digital photography, simple view photography with multiple positions, structured light, or any other device for 3D surface reconstruction.

In exemplary embodiments, the acquisition means may further comprise a keyboard and/or a mouse, or any other means for inputting data, for example, a touch-sensitive screen, a voice recognition system, a data medium reader, a link to a computer network, or a graphics tablet, such listing not being exhaustive.

In exemplary embodiments, the device may further include a cursor displayed by the display means to indicate a value of at least one simulation parameter.

In exemplary embodiments, the device may also be designed so as to allow the user to vary, using the above acquisition means, for example, using a keyboard or a mouse, a direction from which the virtual fringe of lashes is viewed.

Exemplary embodiments of the invention may provide a server, for example an Internet site server, configured to generate, based on at least one value of at least one simulation parameter that is modifiable remotely by a user, at least one synthesized image of a fringe of lashes. The server may, for example, be designed to allow an individual connected to the site to send to the server one or more images, especially at least one image for determining a relief of the face and/or for displaying at least one simulation result. The individual may, if desired or required, then receive beauty advice accompanied by a product, a prescription and/or a purchase order. The server may be designed to allow the user to modify a viewing direction of the image.

Exemplary embodiments of the invention may provide a method of compiling at atlas, in which at least two synthesized images associated with respective different values of at least one simulation parameter are generated by implementing the aforementioned simulation method.

In exemplary embodiments, such an atlas may be used for evaluation of an individual at a point of sale, in a laboratory or at a beauty institute.

In exemplary embodiments, the synthesized images thus generated may be printed, especially on a same medium, or displayed on a same screen, or recorded on a same optical or electronic medium. An identifier, corresponding, for example, to a type of lash, product, treatment and/or make-up, may be associated with each image.

In exemplary embodiments, the atlas may, for example, allow an effect on the appearance of the lashes caused by a change in a parameter to be assessed or may allow a lash typology to be evaluated.

Apart from the classification of the lashes that such an atlas may allow, the atlas may also serve, if desired or required, for teaching purposes.

Exemplary embodiments of the invention may provide an atlas containing at least two synthesized images of a fringe of lashes associated respectively with different values of at least one simulation parameter. An identifier may be associated with each image. For example, the identifier may be an alphanumeric character, a word and/or a logo.

In exemplary embodiments, the identifier may, for example, correspond to a lash typology, a type of product applied, a type of make-up and/or a type of treatment.

Exemplary embodiments of the invention may provide a method for simulating an effect of at least one of using an applicator, applying a product to lashes, and a treatment of the lashes, which comprises: selecting at least one of an applicator, a product, and a treatment apparatus from a plurality, specific simulation characteristics being associated with each applicator, product or treatment apparatus; and causing at least one synthesized image of the lashes with the product applied to them to be presented, for example, on a screen, based on the simulation characteristics of the applicator, the product and/or the treatment apparatus selected.

In exemplary embodiments, the simulation characteristics may be recorded in table in association which each corresponding product, applicator or treatment apparatus.

Exemplary embodiments of the invention may, for example, allow a potential purchaser to visualize, before purchasing, effects likely to be achieved by use of a given product, applicator and/or treatment apparatus.

In exemplary embodiments, the applicator may, for example, be selected from brushes and combs. The product may, for example, be selected from various mascaras, such as, for example, curling, lengthening and/or other mascaras.

In exemplary embodiments, the treatment apparatus may, for example, be selected from various combs and/or heat curlers.

Exemplary embodiments of the invention may provide a method for evaluating a fringe of lashes, in which a comparison may be made between an actual fringe of lashes and an image generated by implementing the aforementioned simulation method.

In exemplary embodiments, such comparison, which may especially be made between an image of the actual lashes and the generated image, after the two images have been displayed on a same screen, may be useful so as, for example, to evaluate the lashes and assign a corresponding identifier to an individual. Knowing the identifier may be useful, for example, to select a make-up product and/or a treatment. For example, in exemplary embodiments, the identifier corresponding to the lashes for which the product or treatment apparatus is designed may be associated with a make-up product or a treatment apparatus, for example, by being printed on packaging.

Exemplary embodiments of the invention may provide a method of promoting sale of a cosmetic product and/or a cosmetic treatment, which includes using a synthesized image of a fringe of lashes generated by implementing the aforementioned simulation method. The promotion may be run via any communication channel. For example, the promotion may be run by a sales individual, directly at a point of sale, via radio, television or telephone, especially within the context of advertising spots or short messages. The promotion may also be run through written press or via some other document, for example, for advertising purposes. The promotion may also be run via the Internet, or any other suitable computer network, or via a mobile telephony network. The promotion may also be run directly via the product, especially on packaging of the product or on any explanatory instructions associated therewith.

Exemplary embodiments of the invention may provide a method for offering beauty advice, which includes: generating at least one advice based on a synthesized image of a fringe of lashes offered to an individual wishing to be advised.

In exemplary embodiments, the synthesized image has been generated, for example, based on at least one item of information originating from the individual wishing to be advised. Accordingly, the synthesized image may present an appearance corresponding to the wishes of that individual.

In exemplary embodiments, an identifier may be associated with the synthesized image, which may help the user to select a product and/or a treatment that allows a corresponding make-up result to be achieved. For example, it may be sufficient for the user to look for a product or a treatment apparatus that includes the identifier corresponding to the desired make-up result.

BRIEF DESCRIPTION OF THE DRAWINGS

The invention may be better understood on reading the following detailed description of non-limiting examples of how various aspects may be implemented and on examining the appended drawings in which:

FIGS. 3 to 5 are exemplary screen pages that may be displayed during the simulation;

FIG. 6 shows schematically an exemplary atlas that may be obtained;

FIG. 7 shows an exemplary device for packaging and applying a product with which an identifier corresponding to a given lash typology is associated;

DETAILED DESCRIPTION OF EMBODIMENTS

Figure 1:
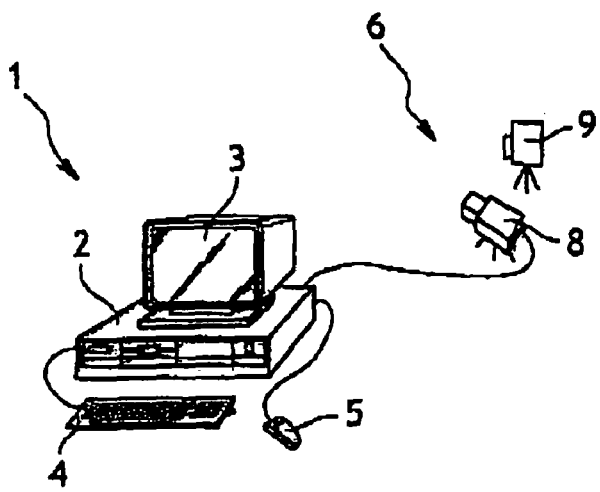
FIG. 1 shows schematically an exemplary simulation device.

FIG. 1 shows a simulation device 1 comprising a computing unit 2, consisting, for example, of the central processing unit of a microcomputer, display means 3, consisting, for example, of a cathode-ray, liquid-crystal, plasma or other screen. The display means 3 may be connected to the computing unit 2, a keyboard 4 and a mouse 5 that are connected to the computing unit 2. The device may also include a 3D image acquisition system 6 comprising, for example, a camera 8 and a fringe projection device 9.

Simulation parameters may be saved by the computing unit 2, for example, on a hard disk or any other data recording means, whether optical, electronic and/or magnetic.

The computing unit 2 may be designed so as to process images taken by the camera 8 so as to generate at least one 3D image of the face and allow the image to be displayed at a viewing angle selected by the user. The relief of the face may, for example, be determined by at least one image being taken by the camera 8 while fringes are being projected onto the face by the projection device 9. The texture of the face may be acquired by the camera 8 without the projection device 9. Software that allows the computing unit 2 to generate 3D images of the face may be, for example, that known by the name MAYA® sold by Alias WaveFront.

Images from only half the face may be acquired and the relief of the entire face may be reconstructed using symmetry between the two half faces.

3D data concerning the face of the individual may be obtained using any appropriate tool for 3D surface reconstruction.

The computing unit 2 may be designed to automatically erase the lashes of the 3D image of the face or to allow them to be erased manually, for example, by the mouse 5 moving a pointer over the 3D image.

In exemplary embodiments, the computing unit 2 may be configured to allow the user to adjust a lash setting arc on the image, for example, using the aforementioned MAYA® software.

Alternatively, the computing unit 2 may itself define the arc, for example, using shape recognition software.

The computing unit 2 may also be programmed so as to be able to generate at least one 3D image of a fringe of lashes, based on simulation parameters relating, for example, to characteristics of the fringe of lashes, characteristics of the lashes of the fringe, characteristics of any product that might have been applied to the lashes and/or characteristics of any treatment that might have been carried out on the lashes.

The synthesized image of the fringe of lashes may be generated by calculating positions in space of each lash of the fringe, based on simulation parameters that may be adjusted by the user, for example, by scroll-down menus displayed alongside a result of the simulation.

In exemplary embodiments, the simulation parameters may include: a number of lashes; presence or absence of product on the lashes; a thickness of the fringe; a curvature of the lashes in degrees; a length of the lashes; a thickness of the lashes; a setting angle of the lashes; a sweep angle of the lashes; a rotation angle of the lashes; a thickness of any product that might be present on the lashes; and a distribution of the product on the lashes of the fringe.

If desired or required, additional simulation parameters may include a nature of the product, a characteristics of the applicator used, and/or a characteristics of the treatment apparatus used.

The thickness of the fringe may be defined as a width of a band of skin into which the lashes are set. When the thickness is very small, the lashes are aligned along a curve that coincides with a longitudinal axis of the fringe. When the thickness is greater, the lashes are set into a band with a width that may be determined by a value of the thickness parameter. The lashes may then be set, for example, on either side of the longitudinal axis of the fringe, along that axis. The spacing of a lash relative to the longitudinal axis of the fringe may depend on a random factor.

The spacing of the lashes in the longitudinal direction may be determined based on a number of lashes in the fringe.

The curvature of a lash may be defined by an angle made between two tangents to a lash at a base and at a free end thereof, respectively.

The setting angle of the lashes may be defined by an angle between a horizontal and a tangent to a lash at the base thereof.

The sweep angle of the lashes may be defined by an angle between a vertical and the tangent to the lash at the base thereof.

The rotation angle of the lashes corresponds to an angle made between the vertical and a plane in which the lash may move.

The product thickness parameter may allow the thickness of the lashes coated with product to be defined.

A proportion parameter may be aimed at correcting the thickness of the coating so as to make the lash more or less elliptical in cross section.

The values of the parameters may be displayed in metric units, for example, mm, cm or in.

To improve realism of the simulation, the appearance of the product coating may be granular. Such a granular appearance may be simulated with the MAYA® software, especially by roughness parameters having different frequencies along the lashes.

Advantageously, the computing unit 2 may be configured to perform a multizone simulation. For example, the user may be able to define, for one or more of the aforementioned simulation parameters, values for at least two, better three zones, namely a central zone and left and right zones lying respectively on either side of the central zone. The three zones may each correspond, for example, to one third of the fringe of lashes.

Figure 3:
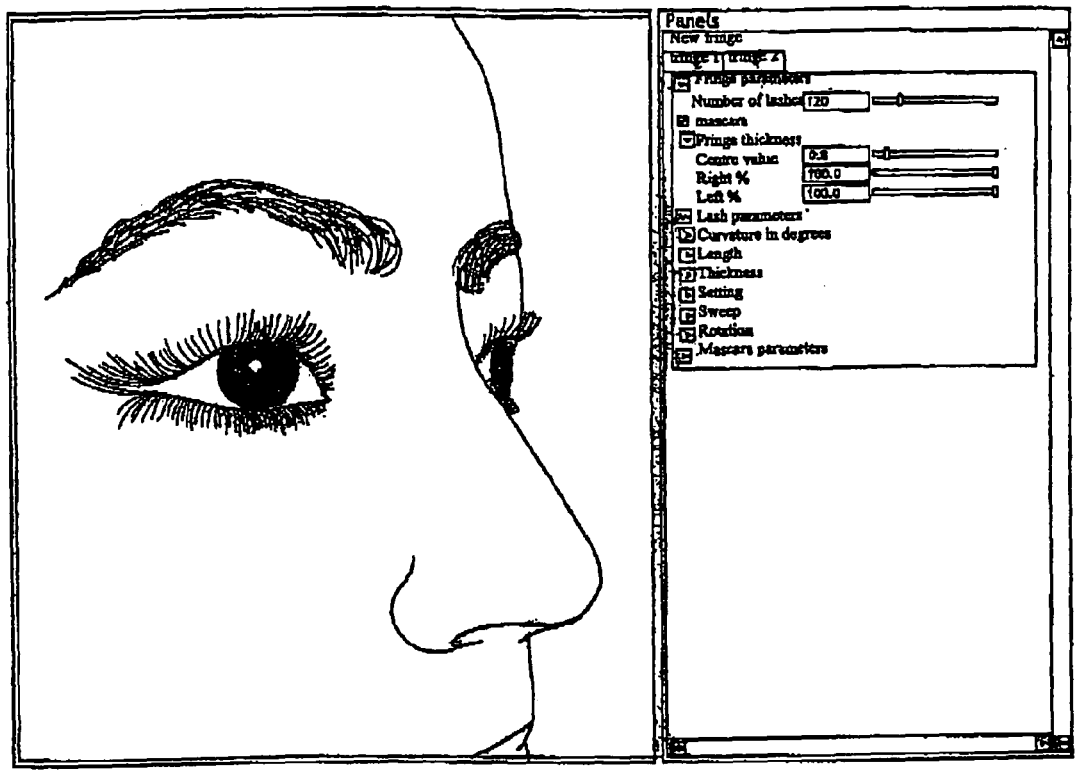
Figure 4:
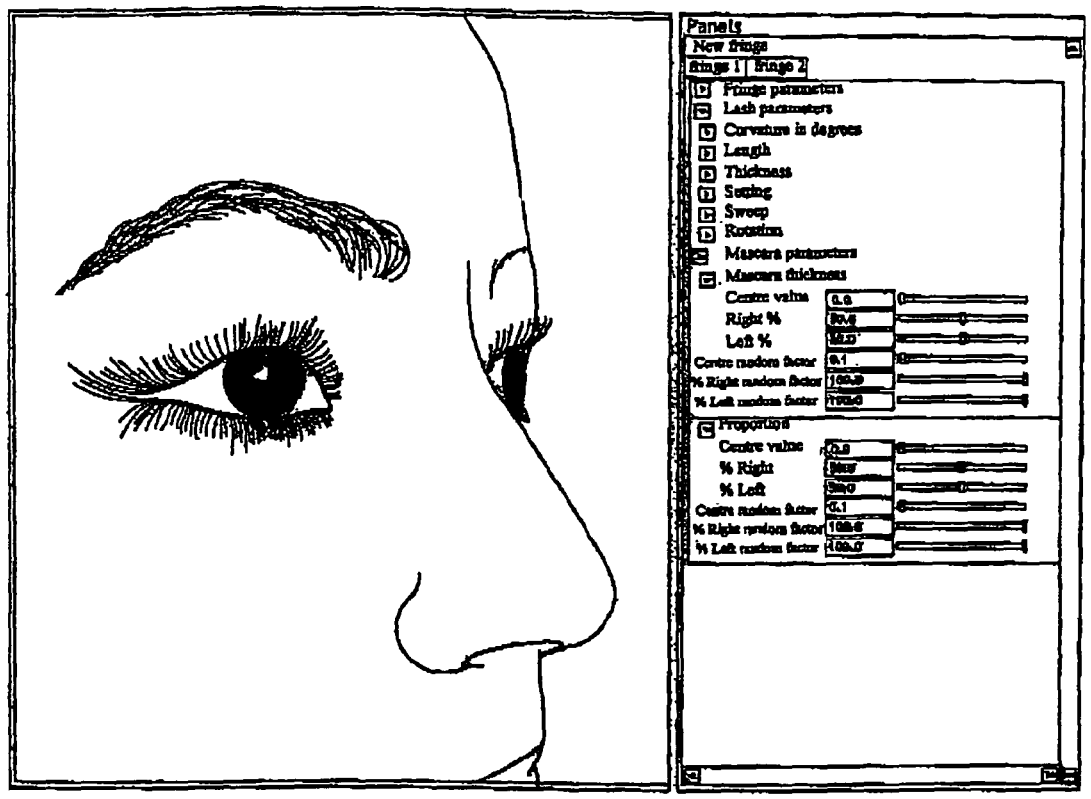

FIGS. 3 to 5 illustrate that the user may define a value of a parameter for the central zone and values for the other zones as a percentage of the value for the central zone.

Advantageously, the parameter values may be modified by cursors that may be displayed on the screen simultaneously with the result of the simulation, as illustrated in FIGS. 3 to 5. The computing unit 2 may be configured to display, if desired, the result of the simulation practically as soon as the value of a simulation parameter has been modified, so as to allow the viewer to properly perceive the changes caused by such a modification.

A random factor may be applied to each parameter for each zone. Thus, a nominal value input by the user may be modified according to the lashes by a random factor, which may contribute to the realism of the simulation.

The device 1 may be used in the following manner.

Figure 2:
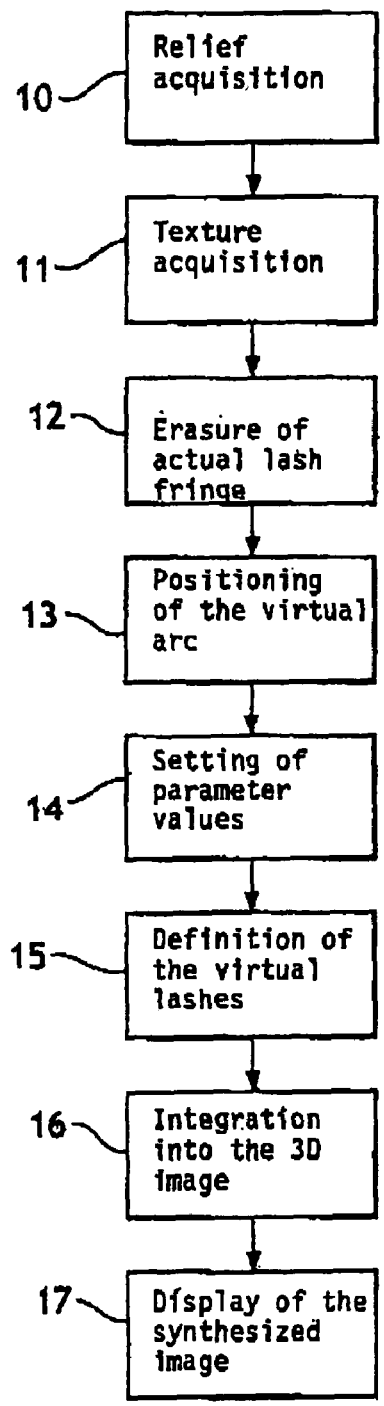
FIG. 2 is a block diagram illustrating various steps of an exemplary method.

Firstly, in steps 10 to 11, as illustrated in FIG. 2, it is possible to proceed with acquisition of relief followed by texture of the face of an individual.

Once the acquisition has been carried out, step 12 in which the lashes are erased may be carried out. Such an erasure may be carried out manually or automatically.

In step 13, the user may position an arc along which the virtual lashes will extend. This positioning may also be carried out automatically.

In step 14, the user may select certain simulation parameters and modify their values. When setting the values, the user may use scroll-down menus, as illustrated in FIGS. 3 to 5.

The computing unit 2 may be configured to read new value or values and to define the virtual lashes in step 15.

Once the virtual lashes have been defined, the virtual lashes may be integrated into the 3D image of the face in step 16 and the resulting image file may be displayed in step 17, recorded on an optical or electronic medium and/or transmitted to a remote point, for example, via the Internet network.

If desired or required, and if the device 1 is so configured, the user may modify a viewing direction so as, for example, to view the lashes from the front, in a three-quarter view or from the side. For this purpose, a cursor or arrows (not shown) may be displayed, which allow the user, for example, to rotate the face to the left or to the right, to lower or raise the viewpoint, or even to move the viewpoint further away or closer.

The user may modify simulation parameters so as, for example, to simulate make-up looks in which the lashes are to a greater or lesser extent coated with product, lengthened and/or curved.

The user may also modify, if the device 1 is so configured, other visual characteristics of the face, for example, the color of a lipstick, hair, foundation, eye shadow, blusher, eyeliner, etc.

The invention may find numerous applications.

Firstly, exemplary embodiments may be used to generate images of lashes corresponding to various typologies, so as to compile an atlas 50, such as that shown schematically in FIG. 6.

To do this, it is possible to print an image corresponding to certain values of the simulation parameters, to modify at least one of the parameters and to repeat the printing step until there are sufficient images to be representative of the change in appearance of the lashes in accordance with the modification of one or more values of the simulation parameters.

The atlas 50 may serve to illustrate lash typologies, each image 51 in the atlas 50 being, for example, associated with one typology, which may be assigned an identifier 52 such as, for example, at least one alphanumeric character.

Thus, it is possible to compile a lash-curvature atlas, a lash-length atlas or a lash make-up atlas, for example, by varying an amount of product applied to the lashes, which are coated with lesser or greater extents.

If desired or required, the identifier 52 associated with an image in the atlas may also appear on a device 53 for packaging and/or applying a product to the lashes, as illustrated in FIG. 7, so as to indicate to consumers the lash typology to which the product is suited or the type of make-up look that is to be obtained.

Figure 8:
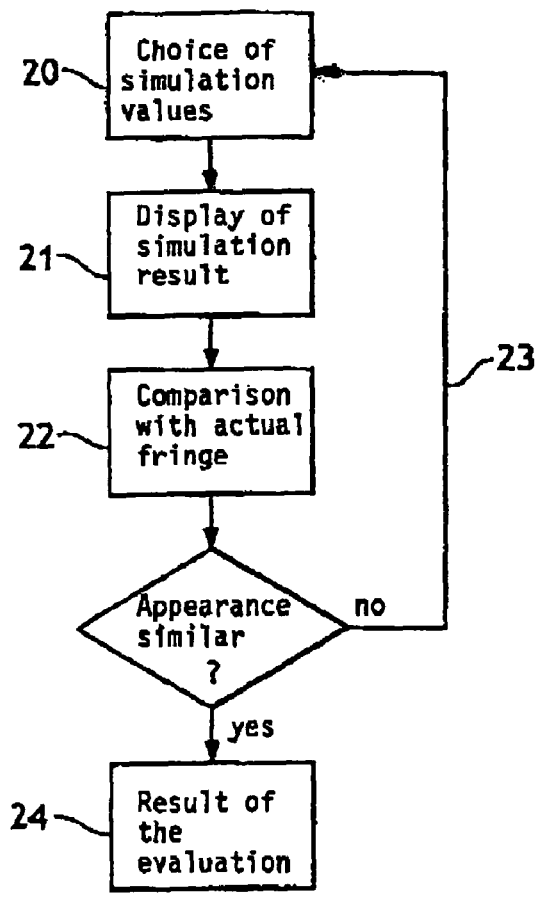
FIGS. 8 and 9 are block diagrams illustrating various steps of other exemplary methods.

Exemplary embodiments also make it possible, as illustrated in FIG. 8, to evaluate the lashes of an individual.

To do this, values of simulation parameters may be selected in step 20 so that the image displayed in step 21 may be compared to the actual lashes in step 22.

When the appearance is insufficiently close, it is possible in step 23 to modify the simulation parameter values and to successively adjust values so as to obtain a simulation result of an appearance deemed to be similar to that of the actual fringe of lashes, for example, in step 24. The actual fringe may then be associated with the values of the simulation parameters. Thus, it is possible to quantify certain visual characteristics of the lashes and, depending on these values, to recommend, for example, that a given product be applied or a given treatment be followed. Similarly, a make-up result may be evaluated.

Figure 9:
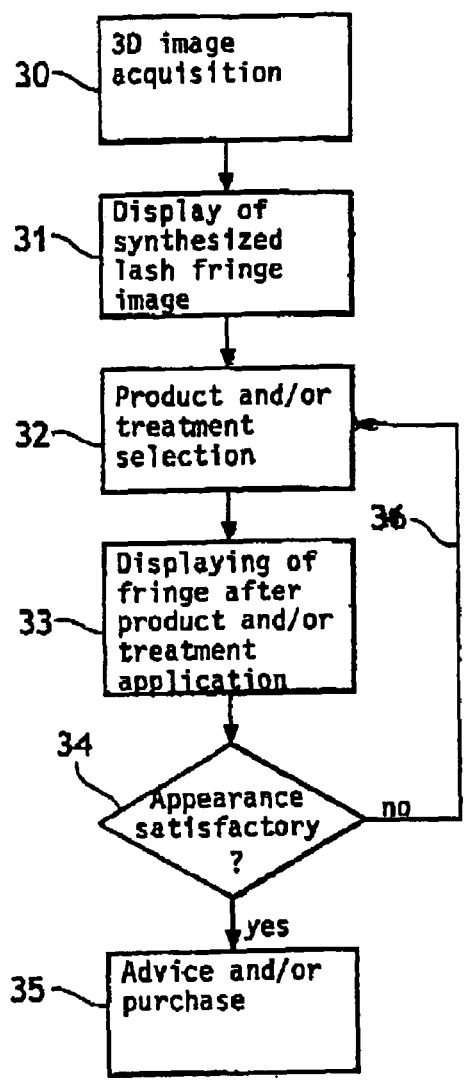

FIG. 9 illustrates another exemplary embodiment of how the invention may be implemented. As shown, the procedure starts in step 30 with acquisition of a 3D image of the face of a consumer, for example, at a point of sale or in a beauty salon.

Next, a synthesized image of the consumer's lashes may be displayed in step 31 and the viewer may, in step 32, select a product and/or a treatment to be applied to the lashes.

A new synthesized image of the lashes may be displayed in step 33 in accordance with the product or treatment selected, so as to allow the consumer to perceive an effect of the product or treatment on the lashes.

In step 34, the consumer may indicate whether the displayed result corresponds to expectations, and if so, it is possible to propose in step 35 that the product be purchased or simply to offer advice regarding the product(s) to be applied or the treatment(s) to be carried out to obtain the desired result.

When the result displayed in step 34 does not correspond to the consumer's expectations, the user may be offered in step 36 the possibility of selecting another product or treatment and returning to step 32.

In another exemplary implementation, step 30 may be omitted and the fringe of lashes may be simulated with the image of a face that is not that of the consumer, for example, a real or synthesized face.

A make-up result may also be simulated before the consumer is offered a product or treatment, for example, so as to allow the consumer to select between several make-up styles.

Figure 10:
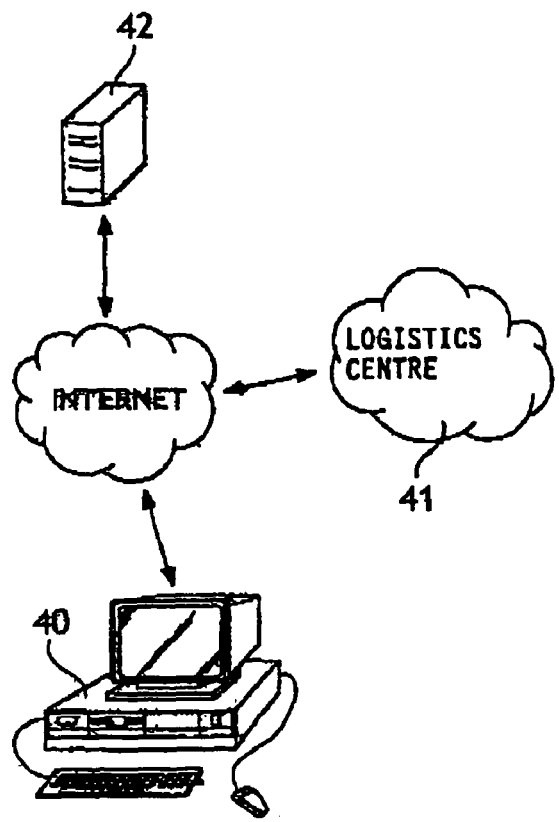
FIG. 10 is a diagram illustrating an exemplary implementation via a computer network.

Exemplary embodiments of the invention may be implemented via the Internet or via any other computer and/or telephone network. In such embodiments, the central processing unit 2 may, for example, be integrated into a server 42 connected to the network, and a user may connect to the server 2 using a computer 40 or any other means for exchanging information with the server 42, for example, an interactive terminal, a mobile telephone or a personal digital assistant, as illustrated in FIG. 10.

If desired or required, the server 2 may be configured to send information to a logistics center 41 configured to send consumers a product or an offer to purchase a product.

The invention is not limited to the exemplary embodiments described above. For example, it is possible to add other simulation parameters relating, for example, to the applicator used for applying make-up to the lashes. Depending on the applicator selected, a product thickness value may, for example, be automatically assigned, or the lashes may be separated and/or curved to a greater or lesser extent.

The central processing unit 2 may also be programmed to recommend an applicator to be used depending on the simulation result displayed. The consumer may then, for example, be recommended to use eyelash curlers to achieve highly curved lashes as shown in the synthesized image.

The nature of the product may also be added as a simulation parameter, for example, so as to allow the user to vary the color of the mascara or the extent to which the lashes are lengthened by the product, especially when the product contains fibers.

If desired or required, the central processing unit 2 may be configured to allow the user to select sections of lashes with a view to applying make-up to the sections differently from a remainder of the fringe.

The 3D image of the lashes may preferably be integrated into a 3D image of a face, but it is also possible to integrate the 3d image of the lashes into one or more 2D images, for example, views of the face from several viewing directions.

In exemplary embodiments, at least one 3D image of at least one portion of the face is generated, displayed and/or printed, with the fringe of eyelashes of one eye being generated with an appearance based on at least one simulation parameter that is modifiable by the user and the other fringe of eyelashes being generated, displayed and/or printed with a different appearance.

For example, one fringe may be generated I accordance with a simulation method as disclosed above, while the other fringe may correspond to the actual fringe of the individual or to a simulated fringe with a different value for said simulation parameter(s).

This may facilitate a comparison by the viewer of the eyelashes with make-up and/or treatment and the eyelashes without make-up or treatment.

Exemplary embodiments may enable an individual to evaluate a desired make-up or treatment of his/her eyelashes.

In exemplary embodiments, the following method may be implemented: allowing an individual to view at least one image of a fringe with a simulated appearance based on at least one simulation parameter; and allowing a user, which may be the individual, to modify the value of said parameter.

Based on the parameters which are modified to have the simulated fringe look like the actual fringe, an evaluation may be performed. For example, starting from a constant initial fringe, the parameters which are modified may vary from one individual to the other. This may provide a tool for evaluation of a fringe of eyelashes, which may be qualified roughly speaking as "reverse measurement."

In other exemplary embodiments, at least one individual may view at least one simulated fringe and may be prompted to modify the appearance of said fringe by modifying at least one simulation parameter.

A simulated fringe may be constructed to reflect the perception that an individual has from his/her fringes of eyelashes. Given the result of the simulated fringe, a beauty advice may be given.

Throughout the description, and also in the claims, the expression "comprising a" or "including a" must be understood as being synonymous with the expression "comprising at least one" or "including at least one," respectively, unless specified to the contrary.

What is claimed is:

1. A computer-implemented method for simulating the appearance of at least one fringe of lashes, comprising:
   generating, using a processing unit, based on at least one value of at least one simulation parameter that is modifiable by a user, at least one 3D image of the at least one fringe of lashes,
   allowing the user to modify the at least one value of the at least one simulation parameter and the at least one simulation parameter relates to at least one characteristic of at least one of a product applied
to the lashes and a cosmetic treatment of the lashes,
   wherein the at least one simulation parameter relates to at least one lash characteristic selected from a curvature of the lashes, a length of the lashes, a thickness of the lashes and angles that define an orientation in which the lashes extend from a surface of the skin, and
   allowing the user to select an applicator impacting at least one of a product thickness value, a lash curvature value, a setting angle of the lashes, a sweep angle of the lashes and a rotation angle of the lashes.

2. The method according to claim 1, wherein the user is allowed to modify the at least one value of the at least one simulation parameter and the at least one simulation parameter relates to at least one characteristic of a product applied to the lashes.

3. The method according to claim 1, wherein the user is allowed to modify the at least one value of the simulation parameter and the at least one simulation parameter relates to at least one characteristic of a cosmetic treatment of the lashes.

4. The method according to claim 3, wherein the cosmetic treatment is at least one treatment selected from combing of the lashes and heat curling of the lashes.

5. The method according to claim 1, further comprising incorporating the at least one 3D image into an image of a face.

6. The method according to claim 5, wherein the image of the face is a 3D image.

7. The method according to claim 6, wherein the image of the face is at least partially a real image.

8. The method according to claim 1, wherein the at least one 3D image is generated lash by lash.

9. The method according to claim 1, wherein the fringe of lashes comprises between about 10 and about 300 lashes.

10. The method according to claim 1, wherein at least one random factor is applied to at least one characteristic of at least one of the fringe, the lashes making up the fringe, and the product applied to the lashes.

11. The method according to claim 1, wherein a user is allowed to modify the at least one value of the simulation parameter and the at least one simulation parameter relates to at least one fringe characteristic.

12. The method according to claim 11, wherein the at least one fringe characteristic is selected from a number of lashes, presence or absence of a make-up product on the lashes, and a thickness of the fringe.

13. The method according to claim 1, wherein the product characteristic is selected from a thickness of the applied product and a distribution of the product.

14. The method according to claim 1, wherein at least one means of setting the at least one value of the at least one simulation parameter is displayed on a same screen as a synthesized image of the fringe of lashes and wherein an appearance of the synthesized image is modified almost simultaneously in response to a change of the at least one simulation parameter.

15. The method according to claim 14, wherein the parameter setting means comprise a cursor.

16. The method according to claim 1, wherein the user is allowed to modify a direction from which the fringe of lashes is viewed.

17. The method according to claim 1, wherein the at least one 3D image is generated from a multizone simulation of the fringe, the multizone simulation allowing the user to define values of simulation parameters specific to at least two different zones of the fringe.

18. The method according to claim 17, wherein at least one central zone and two zones located respectively on either side of the central zone are parameterized differently for the simulation.

19. A method of compiling an atlas, in which at least two synthesized images are generated by implementing the method as defined in claim 1, said two images being associated respectively with different values of the at least one simulation parameter.

20. The method according to claim 19, wherein the at least two synthesized images thus generated are printed.

21. A method for evaluating a fringe of lashes, in which a comparison may be made between an actual fringe of lashes and an image generated by implementing the method as defined in claim 1.

22. A method for simulating an effect of at least one of using an applicator and using a treatment apparatus on at least one fringe of lashes, comprising:
   selecting at least one of an applicator and a treatment apparatus, and a product from a plurality, specific simulation characteristics being associated with each applicator or treatment apparatus, wherein the simulation characteristics associated with each applicator impact at least one of a product thickness value, a lash curvature value, a setting angle of the lashes, a sweep angle of the lashes, and a rotation angle of the lashes, and causing, using a processing unit, at least one synthesized image of the lashes, with at least one of the product applied thereto and the lashes treated with the treatment apparatus, to be presented based on a simulation characteristic of at least one of the applicator and the treatment apparatus.

23. The method according to claim 22, wherein the at least one synthesized image is presented on a screen.

* * * * *